2 Sheets—Sheet 1.

G. J. UTENDORF.
CLOVER THRASHER AND HULLER.

No. 171,492.        Patented Dec. 28, 1875.

Witnesses:
R. M. Johnson
Jos. S. Coombs

Inventor:
Garat Joseph Utendorf
By his Attorney.
James L. Norris.

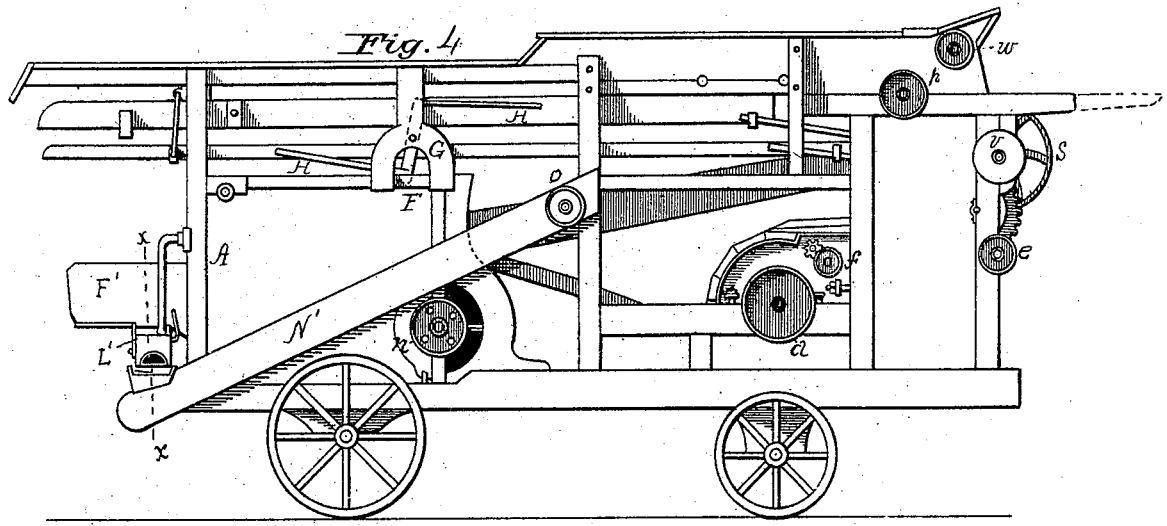
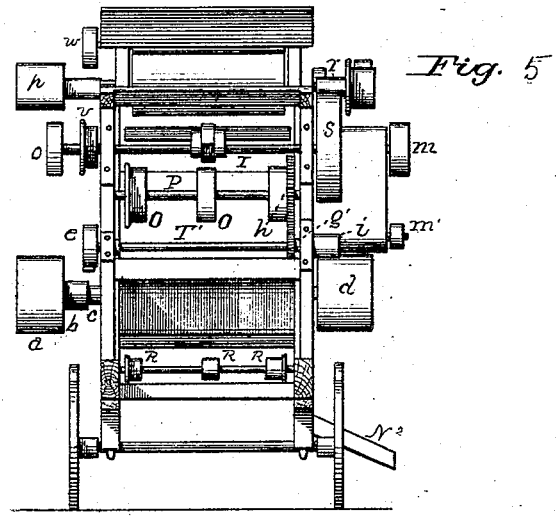
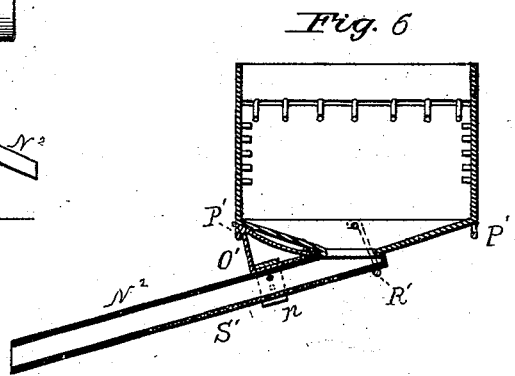

UNITED STATES PATENT OFFICE.

GARAT JOSEPH UTENDORF, OF OTTAWA, OHIO.

IMPROVEMENT IN CLOVER THRASHERS AND HULLERS.

Specification forming part of Letters Patent No. 171,492, dated December 28, 1875; application filed November 27, 1874.

*To all whom it may concern:*

Be it known that I, GARAT JOSEPH UTENDORF, of Ottawa, in the county of Putnam and State of Ohio, have invented certain new and useful Improvements in Combined Thrashing and Hulling Machine, Separator, and Cleaner, of which the following is a specification:

My invention relates to certain improvements in combined thrashing, hulling, and cleaning machines for removing clover-seed from the straw or fibrous portions of the plant, and separating from such clover-seed the foxtail, rag-weed, and other objectionable grain or seed usually obtained along with the clover-seed.

My invention is designed to provide for the discharge of the seed on either side of the apparatus at will; and it consists in a discharge-trough attached to the hopper below the separating-sieves by means of a triangular brace and suitable loops, whereby it is adapted to be turned in either direction.

Figure 1:
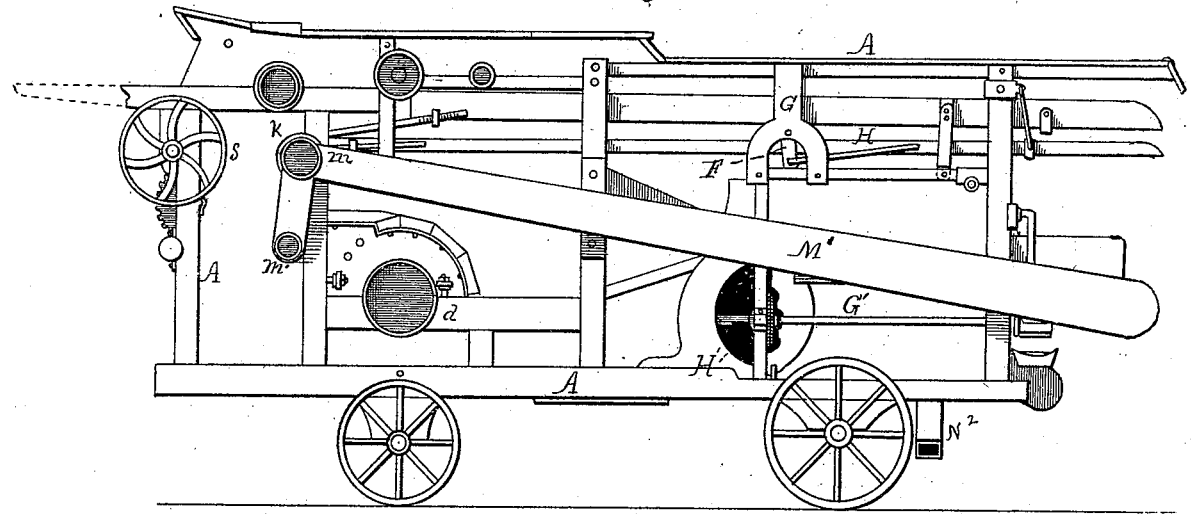
Figure 2:
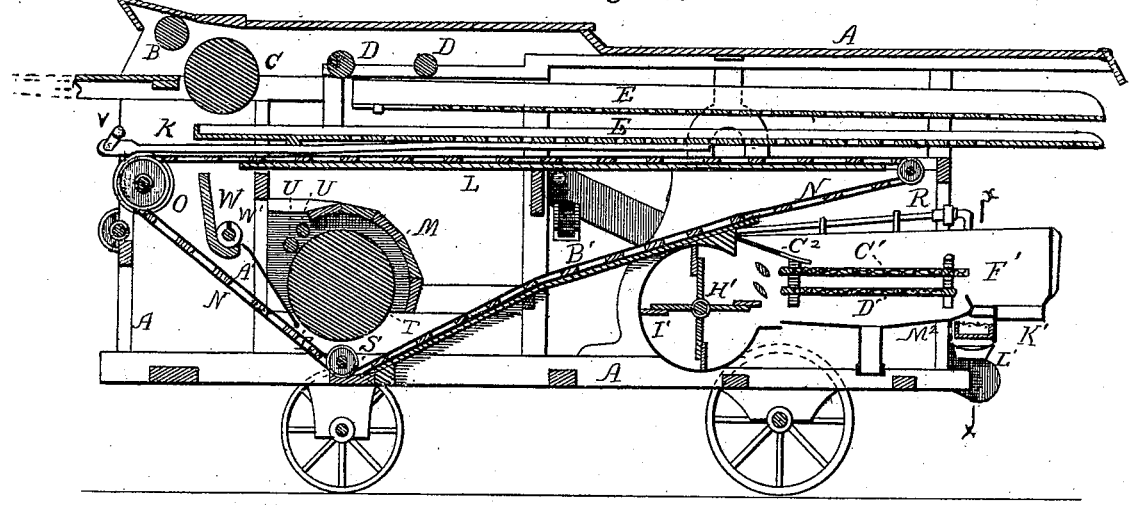
Figure 3:
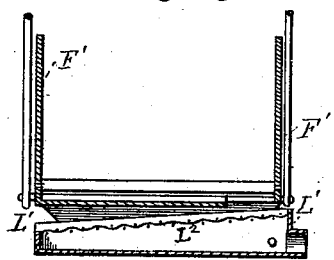

In the drawings, Figure 1 represents a side elevation of my improved machine. Fig. 2 represents a longitudinal vertical section of the same. Fig. 3 represents a transverse vertical section through the line $x\ x$ of Figs. 2 and 4; Fig. 4, an elevation of the side opposite that indicated in Fig. 2; Fig. 5, a front view of the apparatus; and Fig. 6, a sectional view through the adjustable discharge-spout and hopper.

The letter A represents the frame supporting the various working parts of the machinery. Said frame is provided with thrashing-rollers B C at its upper front end, constructed as usual, and guide-rollers D D just back of said thrashing-rollers, to carry the straw onto the shaking-table E, which is constructed and arranged upon hangers, as usual, and operated by the lower sieve E through the medium of a lever, F, pivoted to standard G, and connected to said sieves by links H H. The shaking-table E below is, in like manner, supported upon hangers, and receives its motion from a crank-shaft, I, at the front of the apparatus through the medium of a pitman, K. Both tables are perforated, as usual, and below the same is a floor, L, extending from near the rear of the machine nearly to the front of the same, terminating directly over the mouth of the hulling-chamber M. Over said floor is arranged a slatted belt or sweeper, N, passing around driving-pulleys O, set on the shaft P, journaled at the front of the apparatus, and over pulleys R and S at the rear and bottom of the machine, mounted on suitable shafts. T represents the hulling-roller, and U U two feed-rollers arranged over the same, and operating in connection with it. Said rollers are arranged in the hulling-chamber, which has a hopper, W, in front, forming the mouth to said chamber. W' represents a spiral or screw conveyer, extending along the bottom of the hopper W from the elevator M', having a pulley, $m'$, on one end, which derives motion from the pulley $m$ on the elevator-shaft. Said conveyer serves to carry the tailings from the elevator to the hulling-chamber to be worked over again. From said hopper, extending downward to the roller, is a metallic apron, A', which sets closely against said roller, and prevents any seed from escaping between the two. B' is an inclined bed, leading upward to the rear of the apparatus, and terminating directly over an apron, $C^2$, leading to the sieves $C^1$ and D', which are supported in a shoe, F', which is shaken laterally by means of a shaft, G', Fig. 1, operated by cog-gearing in connection with the shaft H' of the blowing-fan I'. At the rear end of said sieves, and forming part of the shoe in which they are supported, are two troughs, K' and $L^1$, inclining toward opposite sides, leading, respectively, to the elevators $M^1$ and $N^1$. The trough $L^1$ has secured to its top an inclined sieve, $L^2$, upon which the fox-tail and rag-weed seed fall, and by which any clover-seed passing over with the same will be separated and conveyed to the elevator $N^1$, to be returned to the apparatus. The rag-weed and fox-tail seed are thrown off said sieve to one side of the machine. The upper sieve $C^1$ terminates over the trough K', and the lower sieve over the trough $L^1$, the two being arranged directly over the hopper $M^2$ at the bottom of the shoe, from the bottom of which extends a short tube, communicating with the adjustable discharge-spout $N^2$. Said spout is formed of a rectangular tube, open at both ends, the upper end being hinged to a triangular brace, O', the end of which is adapted to set under the loop P' P', attached to either side of the swinging shoe, the end of the tube being held to the discharge-opening of the hopper by means of the loop R', which is capable of being set over it. The body of the trough $N^2$ is supported between two lugs or ears, $n$, projecting downward from the triangular brace O', and provided with a fastening-pin, adapted to pass through apertures in the ears, and an aperture through the trough, in order to hold the same in place. A series of apertures are formed in the ears, in order that the trough may be shifted and adjusted in order to depress or elevate its end.

It will be seen that thus constructed the discharge-spout may be adjusted to discharge to either side of the apparatus.

Along a portion of the bottom of said tube is set a sieve, S', for the purpose of separating the plantain-seed from the clover-seed as it is discharged. The shaft of the hulling-roller forms the main driving-shaft of the apparatus, and is provided with the pulleys $a$ $b$ $c$ at one end, which serve, through the medium of belts, to transmit motion to the entire apparatus, and with a pulley, $d$, by means of which power is applied. The small pulley $c$ is connected by means of a belt with a pulley, $e$, on one end of the shaft T', passing over a pulley, $f$, attached to one of the huller guide-rollers, serving to give motion to the same. The shaft T' is provided with a pinion-wheel, $g'$, near its end, gearing into the cog-wheel $h$, secured to the driving-shaft P of the sweeping-belt, serving to give motion to the same. The shaft T' also carries on its opposite end a pulley, $i$, from which a belt extends over a pulley, $m$ $k$, Fig. 1, of the elevator, which is connected by belt with, and gives motion to, the pulleys $m$ $m'$, which operate the conveyer leading from said elevator to the hulling-chamber. The pulley $b$ on the hulling-shaft connects by belt with a pulley, $n$, on the fan-shaft, which in turn is connected with pulley $o$ of the short elevator. The pulley $a$ on the driving-shaft connects by belting with a pulley, $p$, or on the shaft of one of the thrashing-rollers, which connects, by means of pulley $r$, with a pulley, $s$, on the crank-shaft, which gives motion to the shaking-tables, and also with the guide-rollers by suitable pulleys and belts. The pulley $v$ gives motion to the pulley $w$ by means of a belt.

It will be seen, from the foregoing description, that by simply shifting the belt from the pulleys $a$ and $p$ the upper gearing can be thrown out of operation, stopping the sieves without stopping the sweeping-belt.

The operation of the apparatus will be readily understood. The clover is passed through the thrashing-rollers, falling upon the shaking tables or sieves, the straw being carried to the rear, and the seed falling through the sieves upon the stationary floor below. From thence the seeds are carried to the huller by the slatted belt or sweeper, and, after hulling, the seeds and hulls are carried up the inclined bed to the winnowing-sieves by said belt or sweeper. The seeds and hulls, falling upon the upper sieve, meet with a blast of air from the fan, which blows off the hulls, and the seeds fall through the sieve, the tailings being shaken into trough $k'$, from which they pass into the elevator, and are carried to the hulling-chamber, and are again put through the hulling process. The clover-seed then passes through the lower sieve, the fox-tail and rag-weed seeds being shaken into $L^1$, and out of its open end, and any clover-seed mixed therewith passing through the sieve in its bottom to the short elevator, by which they are carried to the inclined bed. The clover-seed escaping through the lower sieve finally escapes through a distributing-trough into a proper receptacle, the plantain-seed and any dust or dirt smaller than the clover-seed escaping through the sieve in its bottom.

Having thus described my invention, I claim—

The discharge-trough $N^2$, attached to the hopper $M^2$ below the sieves by means of a triangular brace, O', and hooks P' R', thereby adapted to be turned in either direction, substantially as and for the purpose set forth.

In testimony that I claim the foregoing I have hereunto set my hand.

G. JOSEPH UTENDORF.

Witnesses:
 JAMES L. NORRIS,
 JOS. L. COOMBS.